United States Patent [19]

Ohtani et al.

[11] Patent Number: 5,323,181
[45] Date of Patent: Jun. 21, 1994

[54] APPARATUS FOR RECORDING IMAGE HAVING SIZE LARGER THAN TELEVISION IMAGE OF ONE FRAME

[75] Inventors: Akio Ohtani, Hino; Yuji Nagura, Tokyo; Hideaki Iwase, Hino, all of Japan

[73] Assignee: Kowa Company, Ltd., Nagoya, Japan

[21] Appl. No.: 662,726

[22] Filed: Feb. 28, 1991

[30] Foreign Application Priority Data

Mar. 2, 1990 [JP] Japan .................................. 2-49629

[51] Int. Cl.⁵ .............................................. B41J 2/32
[52] U.S. Cl. .............................................. 346/76 PH
[58] Field of Search ............ 346/76 PH, 35; 358/335, 358/450, 453, 345; 395/114

[56] References Cited

U.S. PATENT DOCUMENTS

| | | | |
|---|---|---|---|
| 3,289,196 | 11/1966 | Hull | 346/110 R |
| 4,039,746 | 8/1977 | Talbot | 358/345 |
| 4,282,550 | 8/1981 | Coviello | 358/453 |
| 4,287,521 | 9/1981 | Hakoyama | 346/35 |
| 4,334,231 | 6/1982 | Regehr | 346/35 |
| 4,673,989 | 6/1987 | Yamada et al. | 358/287 |
| 4,675,702 | 6/1987 | Gerber | 346/107 R |
| 4,750,010 | 6/1988 | Ayers et al. | 346/107 R |
| 4,939,581 | 7/1990 | Shalit | 346/110 R |

FOREIGN PATENT DOCUMENTS 0257653 12/1985 Japan .................................. 358/453

Primary Examiner—Benjamin R. Fuller
Assistant Examiner—N. Le
Attorney, Agent, or Firm—Spencer, Frank & Schneider

[57] ABSTRACT

An apparatus for recording an image having a size larger than a television image of one frame including a thermal head having a length which is equal to the longitudinal length of the television image of one frame. An image signal to be recorded is supplied to the thermal head, while a heat sensitive record paper unwound from a paper roll is fed through the thermal head at a constant speed. In this manner an elongated image having a width equal to the longitudinal length of the television image of one frame and a length longer than the lateral length of the television image of one frame is recorded on the heat sensitive record paper. The length of the recorded image is limited only by length of the heat sensitive record paper. In a preferred embodiment, the length of the thermal head is made equal to three times the longitudinal length of the television image of one frame and the image signal to be recorded is stored in a memory. Pixel signals of corresponding scanning lines of three television images of one frame arranged side by side are simultaneously read out and the read out pixel signals are supplied to heater elements of the thermal head.

3 Claims, 4 Drawing Sheets

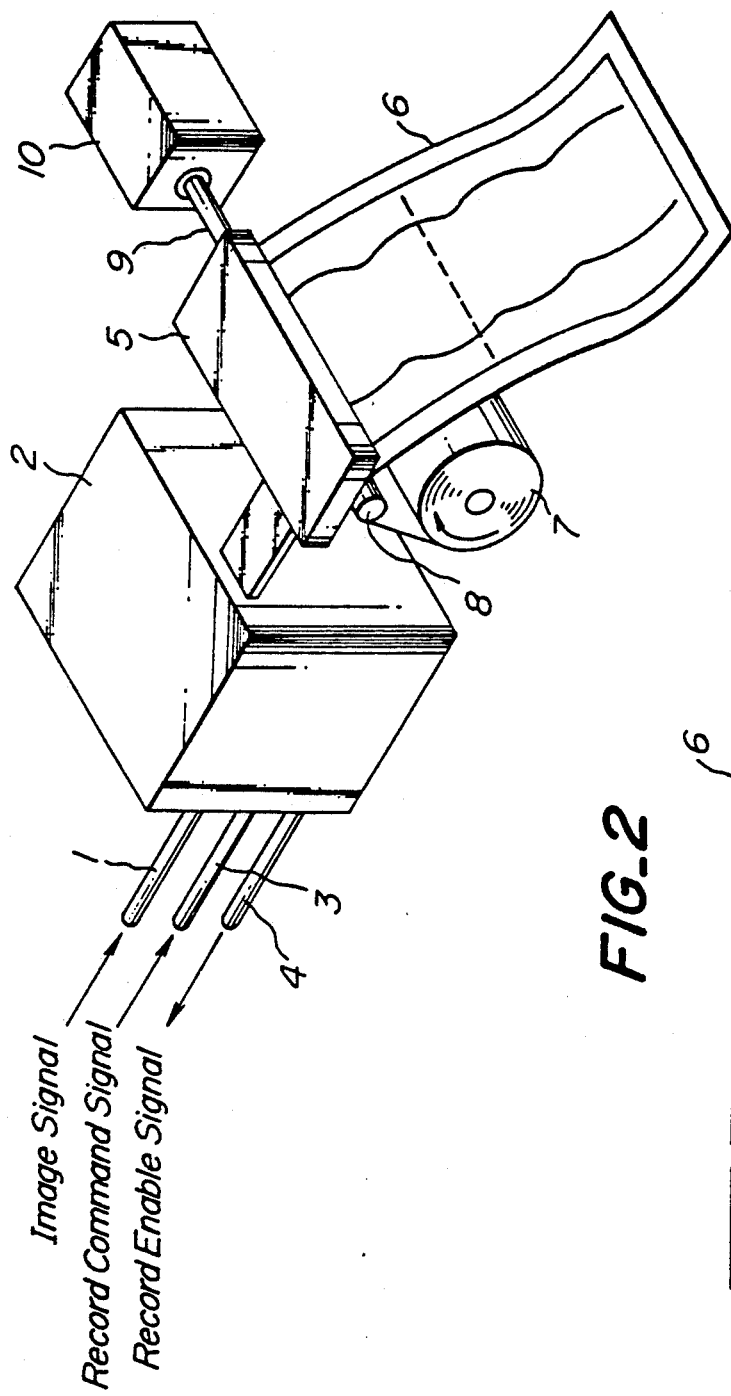
FIG._1
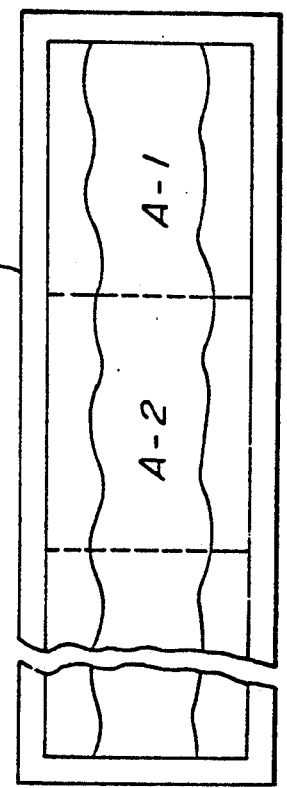
FIG._2

FIG_5
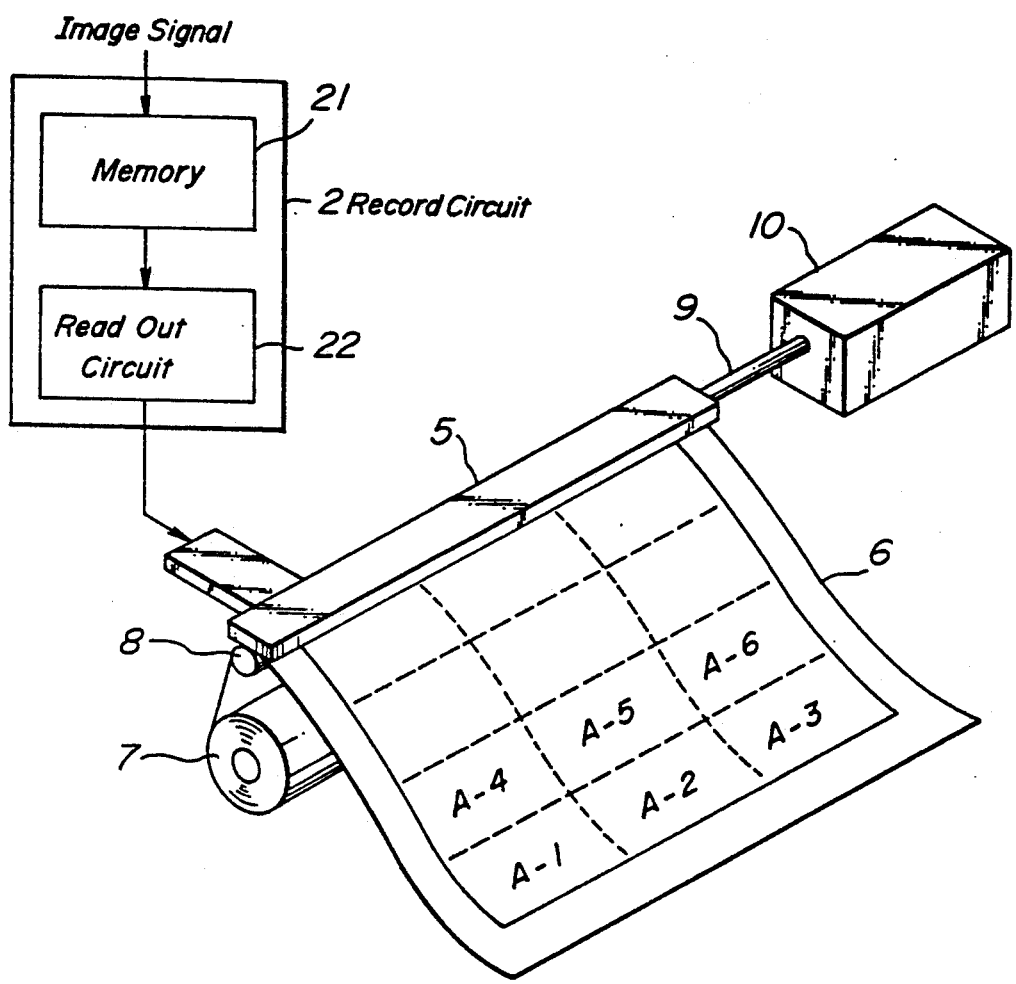
FIG_6
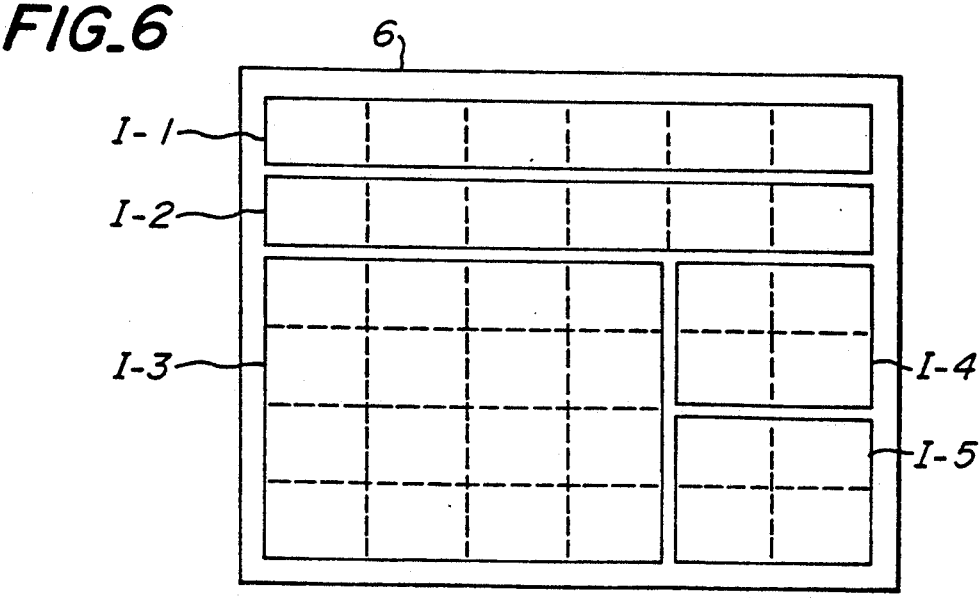

APPARATUS FOR RECORDING IMAGE HAVING SIZE LARGER THAN TELEVISION IMAGE OF ONE FRAME

BACKGROUND OF THE INVENTION

Field of the Invention and Related Art Statement

The present invention relates to an apparatus for recording an image having a size which is larger than a television image of one frame.

There have been proposed apparatuses for recording medical diagnostic images such as ultrasonic on a record medium such as a heat sensitive record paper or a photographic film. One known image recording apparatus is called a thermal line scan recorder, in which an image signal representing an ultrasonic or X-ray image is supplied to a thermal head. One image is recorded on a heat sensitive record paper which is fed through the thermal head at a constant speed, while the heat sensitive record paper is brought into contact with the thermal head. In such an image recording apparatus, the length of the thermal head is made equal to the length of a television image of one frame measured in one direction, e.g. in the longitudinal direction. The heat sensitive record paper has a width equal to the length of the thermal head, and the image signal is supplied to heating elements of the thermal head in such a manner that one scan line of the television image parallel to said direction is simultaneously recorded on the heat sensitive record paper. By moving the heat sensitive record paper over a distance which corresponds to the length of the television image measured in a direction perpendicular to said direction, e.g. in the lateral direction, it is possible to record a single complete image.

In the above mentioned known image recording apparatus, the width of the heat sensitive paper is made equal to the longitudinal length of the television image, and an image having the same size or area as the television image is recorded by moving the heat sensitive record paper over a distance equal to the lateral length of the television image. In such a known image recording apparatus, the size of the image recorded on the heat sensitive record paper is always constant. That is to say, in the known image recording apparatus, the recorded image has the same size as the television image of one frame. In this connection, it should be noted that the size of the television image does not mean the actual size of the television image displayed on a television monitor, because the actual size of the displayed television image is dependent upon the size of the screen of the television monitor. In accordance with progress in the application of ultrasonic and X-ray images to medical diagnosis, it has been required to record medical diagnostic images of various sizes. In order to meet such a request, in the known apparatus, a special interface board is arranged between the image recording apparatus and an image generating apparatus for generating an ultrasonic or X-ray image, and the image signal generated by the image generating apparatus is recorded after being processed by the special interface board. It is apparent that such a special interface board could not be designed easily and the cost of the whole image recording system is liable to be expensive.

SUMMARY OF THE INVENTION

The present invention has for its object to provide a novel and useful apparatus for recording an image having a size larger than that of a television image of one frame without using a special interface board.

According to the invention, an apparatus for recording, on a record medium, an image having a size larger than that of a television image of one frame viewed in at least a first direction comprises:

a recording means for recording simultaneously an image whose size measured in a second direction perpendicular to said first direction is at least equal to the size of the television image of one frame in said second direction; and a driving means for changing the relative position of the record medium and the recording means at least in said first direction.

In a preferred embodiment of the image recording apparatus according to the invention, said recording means comprises a thermal head having a length equal to the size of the television image of one frame measured in said second direction, and said driving means comprises a roller arranged in parallel with the thermal head and a motor coupled with said roller for rotating the roller such that a heat sensitive record paper is fed between said thermal head and the roller in said first direction at a constant speed, whereby an image having a width equal to the size of the television image of one frame measured in said second direction and a length larger than the size of the television image of one frame measured in said first direction is recorded on said heat sensitive record paper. Said recording means further comprises a record circuit connected to said thermal head, and said record circuit includes a memory having a capacity for storing an image signal constituting at least one television image of one frame and a reading-out circuit for reading the image signal out of said memory in such a manner that pixel signals aligned in said second direction are simultaneously read out of the memory.

In another preferred embodiment of the image recording apparatus according to the invention, said recording means comprises a monitor for displaying a television image of one frame, a projection lens for projecting an image displayed on the monitor onto a photographic film constituting the record medium, a housing for supporting said monitor and projection lens, a first driving device for moving said housing in said first direction, and a second driving device for moving said housing in said second direction. The recording means further comprises a memory having a capacity for storing an image signal of at least one television image of one frame and a reading-out circuit for reading the image signal stored in said memory, the read out image signal being supplied to said monitor.

In still another preferred embodiment of the image recording apparatus according to the invention, said recording means comprises a thermal head having a length which is equal to two or more times the length of the television image of one frame measured in said second direction, a memory having a capacity of storing image signal of two or more television images of one frame, and a reading-out circuit for reading the image signal from said memory in such a manner that pixel signals of corresponding scanning lines of two or more television images aligned in said second direction are read out simultaneously.

BRIEF DESCRIPTION OF THE DRAWINGS

FIG. 1 is a perspective view showing a first embodiment of the image recording apparatus according to the invention;

FIG. 2 is a plan view depicting an example of the elongated image recorded by the image recording apparatus shown in FIG. 1;

FIG. 5 is a perspective view depicting a third embodiment of the image recording apparatus according to the invention; and FIG. 6 is a plan view representing an example of the image recorded by the apparatus illustrated in FIG. 5.

DESCRIPTION OF THE PREFERRED EMBODIMENTS

Figure 3:
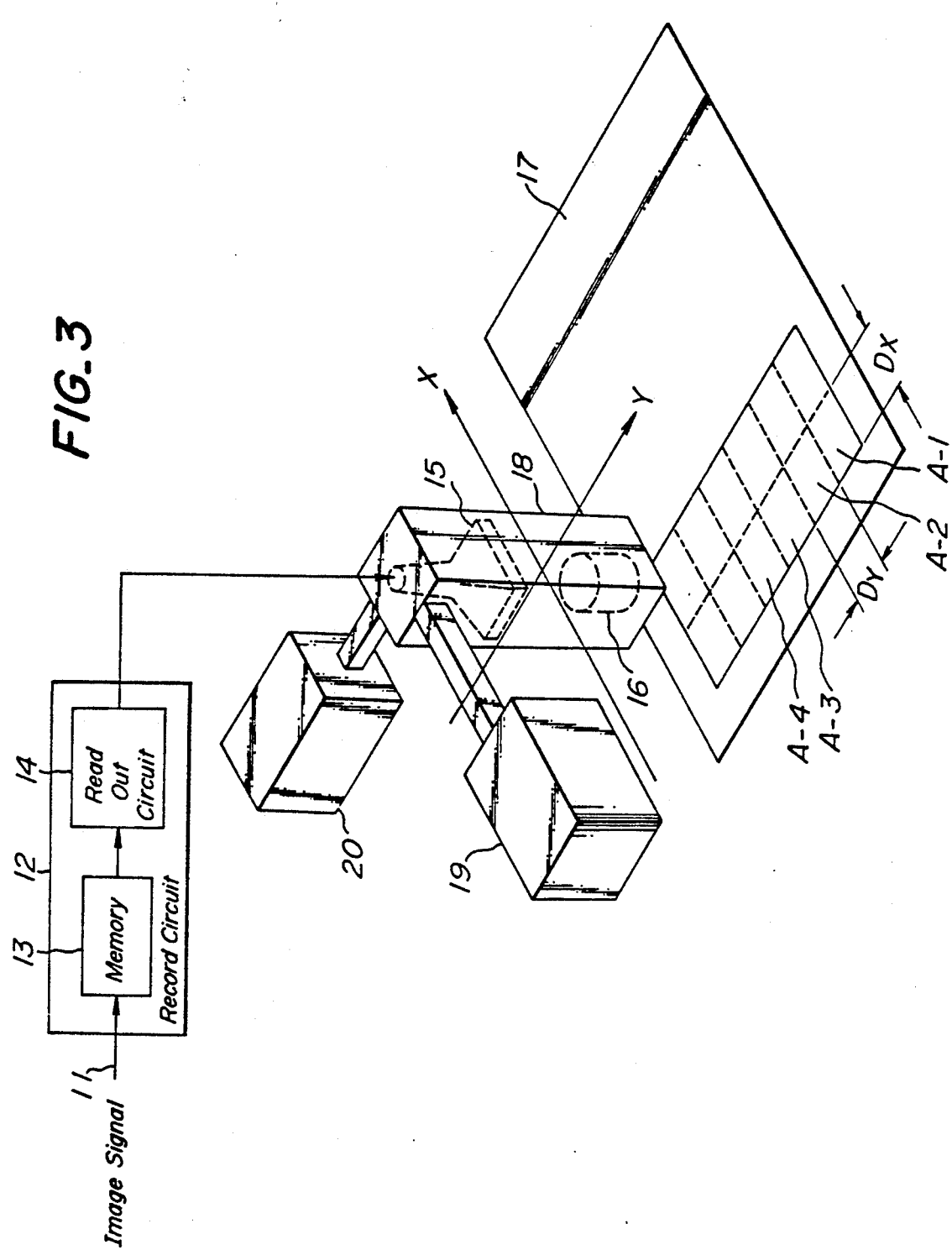
FIG. 3 is a schematic view illustrating a second embodiment of the image recording apparatus according to the invention.

FIG. 1 is a perspective view showing a first embodiment of the image recording apparatus according to the invention. In the present embodiment, it is possible to record an image whose longitudinal dimension is equal to the longitudinal length of the television image of one frame, but whose lateral dimension is longer than the lateral length of the television image of one frame. An image signal to be recorded is generated by an image processing device (not shown) and is supplied via an image input line 1 to a record circuit 2. To the record circuit 2 is also supplied a record command signal via a control line 3. Further the record circuit 2 supplies a record enable signal to the image processing device via a line 4. To the record circuit 2 is connected a thermal record head 5. The record circuit 2 comprises a memory having a capacity for storing at least one television image and a reading-out circuit for reading the image signal out of the memory. In the present embodiment, the reading-out circuit is constructed such that pixel signals aligned in the longitudinal direction are read out simultaneously. The thus read out pixel signals are supplied to heater elements of the thermal head 5. The thermal head 5 has the same construction as a known thermal head, so that its detailed explanation is dispensed with. A heat sensitive record paper 6 is unwound from a roll 7 and is passed between the thermal head 5 and a roller 8 which is coupled with a driving device 10 by means of a shaft 9. By driving the driving device 10 to rotate the roller 8 at a predetermined speed, the heat sensitive record paper 6 is fed through the terminal head 5 at a constant speed. The length of the effective recording area of the thermal head 5 is made slightly smaller than the width of the heat sensitive record paper 6 and thus the longitudinal length of the image is recorded such that it extends over the full width of the record paper. As stated above, the longitudinal length of the television image of one frame does not mean the actual longitudinal length of a television image displayed on the monitor screen. In the present embodiment, the widths of the thermal head 5 and heat sensitive record paper 6 are set such that the television image is recorded on the record paper in such a manner that the pixels aligned in the longitudinal direction extend over the full width of the record paper 6.

FIG. 2 is plan view representing an elongated image formed on the record paper 6 by means of the image recording apparatus shown in FIG. 1. Each of areas A-1, A-2 --- separated by dotted lines corresponds to one frame of the television image. In this embodiment, the heat sensitive record paper 6 is continuously fed through the thermal head 5, while the image signal of successive frames are supplied from the image processing device to the record circuit 2 and the pixel signals aligned in the longitudinal direction are simultaneously supplied to the thermal head 5, so that the image recorded on the heat sensitive record paper 6 has a longitudinal length equal to that of the television image of one frame, but has a lateral length which is longer than that of the television image of one frame. The lateral length is limited only by the length of the record paper 6.

FIG. 3 is a perspective view illustrating a second embodiment of the image recording apparatus according to the invention. In the second embodiment, use is made of a photosensitive film having longitudinal and lateral lengths which are larger than the longitudinal and lateral lengths of the television image of one frame. An image signal to be recorded is supplied to a record circuit 12 by means of an image signal line 11 and is stored in a memory 13 provided in the record circuit 12. In the present embodiment, the memory 13 is constituted by a semiconductor memory having such a capacity that an image signal of the largest image to be recorded on the photographic film can be stored. The image signal stored in the memory is read out by a reading-out circuit 14 in such a manner that portions of the image signal each of which corresponds to the television image of one frame are read out successively. A portion of the image signal thus read out is supplied to a television monitor 15 to display a television image of one frame on its screen. The image displayed on the screen of the monitor 15 is projected by a projection lens 16 onto a photographic film 17 whose longitudinal and lateral sizes are larger than those of the television image of one frame displayed on the monitor 15. The monitor 15 and projection lens 16 are installed in a common housing 18 which is driven in X and Y directions by means of X driving device 19 and Y driving device 20, respectively. The X and Y driving devices 19 and 20 are known and thus their detailed explanation is omitted. For instance, a linear driving mechanism using a motor and a lead screw may be utilized.

In the second embodiment, the image signal generated by an image processing device such as an ultrasonic image generating apparatus or X-ray image generating apparatus is supplied via the line 11 to the record circuit 12 and is stored in the memory 13. Then the image signal stored in the memory 13 is read out by the reading-out circuit 14 in such a manner that portions of the image signal having a size which corresponds to that of the television image of one frame are successively read out. The thus read out image signal is supplied to the monitor 15 to display television images of one frame. These images are successively projected onto the photographic film 17 while the housing 18 is moved intermittently in the X and Y directions. That is to say, at first the housing 18 is positioned such that an image displayed on the monitor 15 is projected on a first area A-1 of the photographic film 17. In this manner a first image portion is recorded on the first area A-1 of the photographic film 17. Then, the Y-driving device 20 is driven to move the housing 18 in the Y direction by a distance DY and a second image portion is recorded on a second area A-2 of the photographic film 17. That is to say, after the housing 18 has been moved into a position corresponding to the second area A-2, an image signal corresponding to a second image portion to be recorded in the second area is read out of the memory 13 and the thus read out image signal is supplied to the monitor 15 to display a television image of one frame. This television image displayed on the monitor 15 is projected onto the second area A-2 of the photographic film 17. By repeating the above operation while the housing 18 is moved in the Y direction in a stepwise manner each time by the distance DY and portions of the image signal stored in the memory 13 are successively read out, the image portions can be successively recorded in areas A-3, A-4 ---. After image portions aligned in a first row in the Y direction have been exposed on the photographic film 17, then the housing 18 is moved in the X direction over a distance DX by driving the X-driving device 19. After that the above mentioned operation is carried out to expose image portions in a second row. In this manner, the whole image stored in the memory 13 is read out and all the image portions are projected onto the photographic film 17. Then, the photographic film 17 is developed to obtain the final image which is larger than the television image of one frame both in the X and Y directions.

Figure 4:
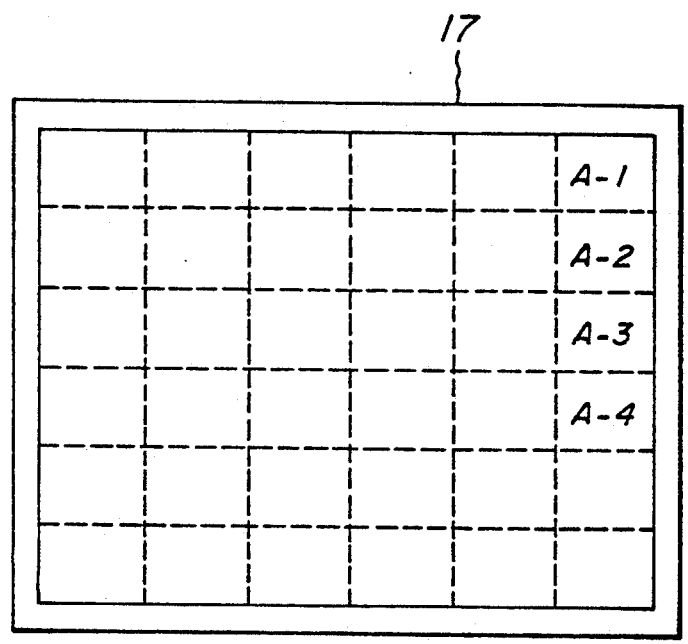
FIG. 4 is a plan view showing a wide image recorded by the image recording apparatus shown in FIG. 3.

FIG. 4 is a plan view showing a photographic film 17 on which an image having a size six times larger than the television image of one frame both in the longitudinal and lateral directions has been recorded.

FIG. 5 is a perspective view showing a third embodiment of the image recording apparatus according to the invention. In the third embodiment, components similar to those shown in FIG. 1 are denoted by the same reference numerals as those used in FIG. 1. In a record circuit 2 there are provided a solid state memory 21 and a reading-out circuit 22. The memory 21 has such a capacity that it can store the image signal including at least three television images of one frame and the reading-out circuit 22 is constructed such that it can read out simultaneously pixel signals of corresponding scanning lines of three television images of one frame. That is to say, at first, pixel signals of first scanning lines of the three television images are read out simultaneously, next, pixel signals of second scanning lines of the three television images of one frame are simultaneously read out, and so on. The pixel signals thus read out are supplied to a thermal head 5 whose length is three times larger than the lateral length of the television image of one frame. A heat sensitive record sheet 6 is unwound from a roll 7 by means of a roller 8 which is driven by a driving device 10 via a shaft 9. The heat sensitive record sheet 6 has a width equal to the length of the thermal head 5. That is to say, the heat sensitive record paper 6 has such a width that three television images of one frame are arranged side by side.

In the present embodiment, the longitudinal length of the image to be recorded on the heat sensitive record sheet 6 is not limited, but since it is not desired to increase the capacity of the memory, after three image portions A-1, A-2 and A-3 have been recorded simultaneously, an image signal of the next three image portions A-4, A-5 and A-6 is newly stored in the memory 21 and then the three image portions A-4, A-5 and A-6 are recorded simultaneously. Then, the capacity of the memory 21 can be reduced to three television images. In this case, if the operation for storing the image signal of three television images of one frame into the memory 21 requires a long time, the movement of the heat sensitive record paper 6 may be stopped during the storing operation.

The present invention is not limited to the embodiments so far explained, but many modifications and alternations may be conceived by those skilled in the art within the scope of the invention. In the above embodiments, the record medium is formed by heat sensitive record paper or photographic film, but according to the invention, when the recording device is constituted such that the image is recorded by the electrophotographic image forming method, the record medium may be formed by normal or plain paper. In the above embodiments, images having dimensions larger than the television image of one frame are recorded, but according to the invention, images I-1, I-2 --- I-5 having various dimensions may be recorded on the same record medium 6 as illustrated in FIG. 6 by using the image recording apparatuses shown in FIG. 5. In this case, at least one image having a size equal to the television image of one frame may be included.

As explained above in detail, in the image recording apparatus according to the present invention, it is possible to record images having sizes larger than the television image of one frame, so that it is no longer necessary to arrange a special interface board between the image generating apparatus and the image recording apparatus. Therefore, the image recording apparatus according to the invention can be made simple in construction and cheap in cost. Further, large images such as elongated and high definition images can be recorded simply.

What is claimed is:

1. An apparatus for recording, on a heat sensitive record paper, an image having an area larger than a television image of one frame, said image having a length extending in a first direction and a width extending in a second direction perpendicular to said first direction, said television image having a length extending in said first direction and a width extending in said second direction, comprising:

recording means for recording said image including
a record circuit having
a memory for storing an image signal of at least two television images of one frame; and
a reading-out circuit coupled to said memory for reading out simultaneously pixel signals of corresponding scanning lines of said at least two television images of one frame; and
a thermal head coupled to said reading-out circuit, said thermal head comprising heater elements having a length equal to a sum of the width of each of said at least two television images, the heater elements of said thermal head extending in said second direction;

driving means for feeding said heat sensitive record paper including
a roller positioned in parallel with said thermal head; and
a motor coupled to said roller, said motor rotating the roller to feed said heat sensitive record paper between said thermal head and the roller in said first direction at a constant speed, whereby an image having a width equal to at least two times the width of the television image of one frame measured in said second direction and a length greater than the length of the television image of one frame measured in said first direction is recorded on the heat sensitive record paper.

2. An apparatus according to claim 1, wherein said memory stores an image signal of three television images of one frame, said reading-out circuit reads out simultaneously pixel signals of corresponding scanning lines of said three television images of one frame, and said heater elements have a length equal to a sum of the lengths of said three television images, whereby an image having a width equal to three times the width of the television image of one frame measured in said second direction and a length larger than the length of the television image of one frame measured in said first direction is recorded on the heat sensitive record paper.

3. An apparatus for recording, on a heat sensitive record paper, an image having an area larger than a television image of one frame, said image having a length extending in a first direction and a width extending in a second direction perpendicular to said first direction, said television image having a length extending in said first direction and a width extending in said second direction, comprising:

recording means for recording said image including
  a record circuit having
    a memory for storing an image signal of at least two television images of one frame; and
    a reading-out circuit coupled to said memory for reading out simultaneously pixel signals of successive scanning lines of said at least two television images of one frame; and
    a thermal head coupled to said reading-out circuit, said thermal head comprising heater elements having a length equal to the width of the television image of one frame measured in said second direction, the heater elements of said thermal head extending in said second direction; and driving means for feeding said heat sensitive record paper including
  a roller positioned in parallel with said thermal head; and
  a motor coupled to said roller, said motor rotating the roller to feed said head sensitive record paper between said thermal head and the roller in said first direction at a constant speed, whereby an image having a width equal to the width of the television image of one frame measured in said second direction and a length larger than the length of the television image of one frame measured in said first direction is recorded on the heat sensitive record paper.

* * * * *